United States Patent
Barber et al.

(10) Patent No.: US 10,831,736 B2
(45) Date of Patent: Nov. 10, 2020

(54) FAST MULTI-TIER INDEXING SUPPORTING DYNAMIC UPDATE

(71) Applicant: International Business Machines Corporation, Armonk, NY (US)

(72) Inventors: Ronald J. Barber, San Jose, CA (US); Viktor Leis, Garching (DE); Guy M. Lohman, San Jose, CA (US); Vijayshankar Raman, Sunnyvale, CA (US); Richard S. Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 14/671,692

(22) Filed: Mar. 27, 2015

(65) Prior Publication Data
US 2016/0283538 A1 Sep. 29, 2016

(51) Int. Cl.
*G06F 16/22* (2019.01)

(52) U.S. Cl.
CPC ...... *G06F 16/2272* (2019.01); *G06F 16/2255* (2019.01)

(58) Field of Classification Search
CPC .......... G06F 17/3033; G06F 17/30333; G06F 17/30336; G06F 16/2272; G06F 16/22; G06F 16/2255; G06F 16/2246
USPC ........................................................ 707/747
See application file for complete search history.

(56) References Cited

U.S. PATENT DOCUMENTS

| | | | |
|---|---|---|---|
| 5,455,826 A | 10/1995 | Ozveren et al. |
| 5,598,559 A | 1/1997 | Chaudhuri |
| 5,706,495 A | 1/1998 | Chadha et al. |
| 5,740,440 A | 4/1998 | West |
| 5,794,229 A | 8/1998 | French |

(Continued)

FOREIGN PATENT DOCUMENTS

| | | |
|---|---|---|
| CN | 1522409 A | 8/2004 |
| CN | 1968212 A | 5/2007 |

(Continued)

OTHER PUBLICATIONS

Anonymous, "System and Method for Usage Aware Row Storage in Database Systems", Jul. 23, 2010, pp. 1-4, ip.com, United States.
(Continued)

*Primary Examiner* — Evan Aspinwall
(74) *Attorney, Agent, or Firm* — Sherman IP LLP; Kenneth L. Sherman; Steven Laut

(57) ABSTRACT

A method includes performing a lookup using a key into a root node of a multi-tier data structure, to find a partition for performing an insert. A lookup for the key is performed on a first level index that is part of a linked data structure. A payload or reference is added to the linked data structure based on data structure criterion, otherwise the key and the payload are added to the linked data structure if the key is not found. A new first level index is created and added to the linked data structure upon the linked data structure remaining unchanged. The key and the payload or reference are added to the new index. Based on merge criterion, a new second level index is created and a portion of content from selected first level and second level indexes are merged for combining into the new second level index.

14 Claims, 15 Drawing Sheets

(56) References Cited

U.S. PATENT DOCUMENTS

| | | | |
|---|---|---|---|
| 5,893,086 A | 4/1999 | Schmuck et al. | |
| 5,930,785 A | 7/1999 | Lohman et al. | |
| 6,026,394 A | 2/2000 | Tsuchida et al. | |
| 6,052,697 A | 4/2000 | Bennett | |
| 6,134,601 A | 10/2000 | Spilo et al. | |
| 6,247,014 B1* | 6/2001 | Ladwig | G06F 17/30949 707/747 |
| 6,292,795 B1 | 9/2001 | Peters et al. | |
| 6,505,189 B1 | 1/2003 | On Au et al. | |
| 6,609,131 B1 | 8/2003 | Zait et al. | |
| 6,757,677 B2 | 6/2004 | Pham et al. | |
| 6,775,681 B1 | 8/2004 | Ballamkonda et al. | |
| 6,941,432 B2 | 9/2005 | Ronstrom | |
| 6,954,776 B1 | 10/2005 | Cruanes et al. | |
| 7,062,481 B2 | 6/2006 | Pham et al. | |
| 7,136,883 B2 | 11/2006 | Flamma et al. | |
| 7,177,883 B2 | 2/2007 | Yagawa | |
| 7,287,131 B1 | 10/2007 | Martin et al. | |
| 7,293,028 B2 | 11/2007 | Cha et al. | |
| 7,308,539 B2 | 12/2007 | Fuhs et al. | |
| 7,343,363 B1 | 3/2008 | Parker | |
| 7,412,439 B2 | 8/2008 | Bossman et al. | |
| 7,499,960 B2 | 3/2009 | Dageville et al. | |
| 7,653,670 B2 | 1/2010 | Hasan et al. | |
| 7,688,758 B2 | 3/2010 | Denby et al. | |
| 7,716,180 B2 | 5/2010 | Vermeulen et al. | |
| 7,827,182 B1 | 11/2010 | Panigrahy | |
| 7,827,218 B1 | 11/2010 | Mittal | |
| 7,868,789 B1 | 1/2011 | Binnig et al. | |
| 8,078,593 B1* | 12/2011 | Ramarao | G06F 3/0671 707/692 |
| 8,145,642 B2 | 3/2012 | Cruanes et al. | |
| 8,195,644 B2 | 6/2012 | Xu | |
| 8,271,564 B2 | 9/2012 | Dade | |
| 8,321,385 B2 | 11/2012 | Burroughs et al. | |
| 8,346,810 B2 | 1/2013 | Beaverson et al. | |
| 8,370,316 B2 | 2/2013 | Bensberg et al. | |
| 8,438,574 B1 | 5/2013 | Lyle et al. | |
| 8,443,155 B2 | 5/2013 | Adams et al. | |
| 8,661,005 B2 | 2/2014 | McKenney et al. | |
| 8,692,695 B2 | 4/2014 | Fallon et al. | |
| 8,768,889 B1 | 7/2014 | Martin | |
| 8,768,927 B2 | 7/2014 | Yoon et al. | |
| 8,832,025 B2 | 9/2014 | Arai et al. | |
| 8,856,103 B2 | 10/2014 | Barber et al. | |
| 8,886,614 B2 | 11/2014 | Morris | |
| 9,092,141 B2 | 7/2015 | Hayashi et al. | |
| 9,098,201 B2 | 8/2015 | Benjamin et al. | |
| 9,298,723 B1* | 3/2016 | Vincent | G06F 16/1748 |
| 9,355,060 B1 | 5/2016 | Barber et al. | |
| 9,430,390 B2 | 8/2016 | Mukherjee et al. | |
| 9,454,560 B2 | 9/2016 | Cha et al. | |
| 9,626,421 B2 | 4/2017 | Plattner et al. | |
| 9,684,682 B2 | 6/2017 | Mukherjee et al. | |
| 9,792,318 B2 | 10/2017 | Schreter et al. | |
| 2001/0039609 A1 | 11/2001 | Houldsworth et al. | |
| 2002/0016820 A1 | 2/2002 | DuVal et al. | |
| 2003/0198291 A1* | 10/2003 | Gold | H04N 19/61 375/240.01 |
| 2004/0260684 A1 | 12/2004 | Agrawal et al. | |
| 2005/0018683 A1 | 1/2005 | Zaho et al. | |
| 2005/0033741 A1 | 2/2005 | Dombroski et al. | |
| 2006/0218176 A1 | 9/2006 | Sun Hsu et al. | |
| 2007/0136317 A1 | 6/2007 | Przywara | |
| 2007/0208788 A1 | 9/2007 | Chakravarty et al. | |
| 2007/0244850 A1 | 10/2007 | Hoppe et al. | |
| 2007/0245119 A1 | 10/2007 | Hoppe | |
| 2008/0126706 A1 | 5/2008 | Newport et al. | |
| 2008/0133583 A1 | 6/2008 | Artan et al. | |
| 2008/0162402 A1 | 7/2008 | Holmes et al. | |
| 2009/0006399 A1 | 1/2009 | Raman et al. | |
| 2009/0024568 A1 | 1/2009 | Al-Omari et al. | |
| 2009/0100223 A1 | 4/2009 | Murayama et al. | |
| 2009/0187586 A1 | 7/2009 | Olson | |
| 2009/0210445 A1 | 8/2009 | Draese et al. | |
| 2009/0222659 A1 | 9/2009 | Miyabayashi et al. | |
| 2010/0088309 A1 | 4/2010 | Petculescu et al. | |
| 2010/0114868 A1 | 5/2010 | Beavin et al. | |
| 2010/0131540 A1 | 5/2010 | Xu | |
| 2010/0199066 A1 | 8/2010 | Artan et al. | |
| 2010/0223253 A1 | 9/2010 | Gopal et al. | |
| 2011/0060876 A1 | 3/2011 | Liu | |
| 2011/0066593 A1 | 3/2011 | Ahluwalia et al. | |
| 2011/0078134 A1 | 3/2011 | Bendel et al. | |
| 2011/0107021 A1 | 5/2011 | Muthukumarasamy et al. | |
| 2011/0283082 A1 | 11/2011 | McKenney et al. | |
| 2011/0307471 A1 | 12/2011 | Sheinin | |
| 2012/0011133 A1 | 1/2012 | Faerber et al. | |
| 2012/0011144 A1 | 1/2012 | Transier et al. | |
| 2012/0036134 A1 | 2/2012 | Malakhov | |
| 2012/0117055 A1 | 5/2012 | Al-Omari et al. | |
| 2012/0136846 A1 | 5/2012 | Song et al. | |
| 2012/0136889 A1 | 5/2012 | Jagannathan et al. | |
| 2012/0143877 A1 | 6/2012 | Kumar et al. | |
| 2012/0158729 A1 | 6/2012 | Mital et al. | |
| 2012/0166400 A1 | 6/2012 | Sinclair et al. | |
| 2012/0173517 A1 | 7/2012 | Lang et al. | |
| 2012/0260349 A1 | 10/2012 | Nagai et al. | |
| 2012/0303633 A1 | 11/2012 | He et al. | |
| 2012/0310917 A1 | 12/2012 | Sheinin et al. | |
| 2012/0331249 A1 | 12/2012 | Benjamin et al. | |
| 2013/0046949 A1 | 2/2013 | Colgrove et al. | |
| 2013/0138628 A1 | 5/2013 | Bensberg et al. | |
| 2013/0218934 A1 | 8/2013 | Lin et al. | |
| 2013/0325900 A1 | 12/2013 | Barber et al. | |
| 2014/0006379 A1 | 1/2014 | Arndt et al. | |
| 2014/0025648 A1 | 1/2014 | Corbett et al. | |
| 2014/0074819 A1 | 3/2014 | Idicula | |
| 2014/0108489 A1 | 4/2014 | Glines et al. | |
| 2014/0129568 A1 | 5/2014 | Kim et al. | |
| 2014/0181052 A1 | 6/2014 | Moore et al. | |
| 2014/0214795 A1 | 7/2014 | Attaluri et al. | |
| 2014/0215019 A1 | 7/2014 | Ahrens | |
| 2014/0337375 A1 | 11/2014 | Yue | |
| 2014/0372388 A1 | 12/2014 | Attaluri et al. | |
| 2015/0058293 A1 | 2/2015 | Kobayashi et al. | |
| 2015/0088813 A1 | 3/2015 | Lahiri et al. | |
| 2015/0301743 A1 | 10/2015 | Nagao et al. | |
| 2016/0147457 A1 | 5/2016 | Legler et al. | |
| 2016/0232169 A1* | 8/2016 | Archak | G06F 17/30132 |

FOREIGN PATENT DOCUMENTS

| | | |
|---|---|---|
| CN | 101013427 A1 | 8/2007 |
| CN | 101067822 A1 | 11/2007 |
| CN | 1003672239 C | 2/2008 |
| CN | 101231657 A | 7/2008 |
| CN | 101388042 A | 3/2009 |
| CN | 101573760 A | 11/2009 |
| CN | 101828182 A | 9/2010 |
| CN | 102893265 A | 1/2013 |
| CN | 103635902 A | 3/2014 |
| CN | 104021205 A | 9/2014 |
| CN | 104317966 A | 1/2015 |
| EP | 0457707 A2 | 11/1991 |
| EP | 2811411 A1 | 12/2014 |
| JP | 2007234026 A | 9/2007 |
| JP | 2010539616 A | 12/2012 |
| JP | 2013222457 A | 10/2013 |
| WO | 2011148496 | 12/2011 |
| WO | 2013141308 A | 9/2013 |
| WO | 2014010038 A | 1/2014 |
| WO | 2014045441 A | 3/2014 |
| WO | 2015078136 A1 | 6/2015 |

OTHER PUBLICATIONS

Anonymous, "High Performance Technique Using Join Collocation in a Massively Parallel Processing Relational Database Implementation", Jun. 14, 2012, pp. 1-5, IP.com, United States.

Anonymous, "CashMap: Processor Cache-Aware Implementation of Hash Tables", Jul. 5, 2013, pp. 1-7, IP.com, United States.

(56) References Cited

OTHER PUBLICATIONS

Anonymous, "Efficient Grouping Over Joins of Compressed Tables", Apr. 6, 2010, pp. 1-6, IP.com, United States.

Internet Society, et al., "The VCDIFF Generic Differencing and Compression Data Format (RFC3284)", Jul. 1, 2002, pp. 1-31, Network Working Group, IP.com, United States.

Hu, K. et al. "Rapid multi-dimension hierarchical algorithm in data warehouse system", Computer Integrated Manufacturing Systems, Jan. 2007, p. 196-201, vol. 13, No. 1, China.

Raman, V., et al., "DB2 with BLU Acceleration: So Much More than Just a Column Store", Proceedings of the VLDB Endowment, Aug. 2013, pp. 1-12, vol. 6, No. 11, ACM, United States.

Spyros, B., et al., "Design and Evaluation of Main Memory Hash Join Algorithms for Multi-core CPUs", SIGMOD Int'l Conference on Management of Data, Jun. 12, 2011, pp. 1-12, ACM, United States.

Korn, D., et al., "The VCDIFF Generic Differencing and Compression Data Format (RFC3284)", Jul. 1, 2002, pp. 1-31, Network Working Group, IP.com, United States.

Yan, Weipeng P. et al., "Performing Group-By before Join [query processing]," Proceedings 1oth International Conference on Data Engineering, 1994, pp. 89-100, IEEE, 1994.

List of IBM Patents or Patent Applications Treated as Related Form.

List of IBM Patents or Applications Treated as Related.

Gao, H. et al., "Lock-free dynamic hash tables with open addressing", Journal of Distributed Computing, Jul. 2005, pp. 21-42, vol. 18, Issue 1, United Kingdom.

Sewall, J. et al., "PALM: Parallel Architecture-Friendly Latch-Free Modifications to B+ Trees on Many-Core Processors", Proceedings of the 37th International Conference on Very Large Data Bases (VLDB Endowment), Aug. 29, 2011-Sep. 3, 2011, pp. 795-806, vol. 4, No. 11, United States.

Pandis, I. et al., "PLP: Page Latch-free Shared-everything OLTP", Proceedings of the 37th International Conference on Very Large Data Bases (VLDB Endowment), Aug. 29, 2011-Sep. 3, 2011, pp. 610-621, vol. 4, No. 10, United States.

Areias, M. et al., "A Simple and Efficient Lock-Free Hash Trie Design for Concurrent Tabling", Theory and Practice of Logic Programming, May 14, 2014, pp. 1-10, Arxiv.org, Cornell University Library, United States.

Prokopec, A. et al., "Lock-Free Resizeable Concurrent Tries", Languages and Compilers for Parallel Computing, 2013, pp. 156-170, vol. 7146, Springer Berlin Heidelberg, Germany.

Levandoski, J., et al., "The Bw-Tree: A B-tree for New Hardware Platforms", IEEE 29th International Conference on Data Engineering (ICDE), Apr. 8, 2013, pp. 1-12, IEEE, United States.

Leis, V., et al., "The Adaptive Radix Tree: ARTful Indexing for Main-Memory Databases", IEEE 29th International Conference on Data Engineering (ICDE), Apr. 8, 2013, pp. 38-49, IEEE, United States 156-PA.

Lehman, T.J. "Design and Performance Evaluation of a Main Memory Relational Database System." 1986, PhD Dissertation, 334 pages, [Abstract Only], University of Washington, Madison, WI.

Mell, P., et al., "The NIST Definition of Cloud Computing", National Institute of Standards and Technology Special Publication 800-145, Sep. 2011, pp. 1-7, U.S. Department of Commerce, United States.

Marek, R., et al., "TID Hash Joins," CIKM, 1994, pp. 42-49, Gaithersburg, MD, United States.

Chang. S., "Recent Advances of Compact Hashing for Large-Scale Visual Search", Columbia University, Oct. 2012, pp. 1-44, United States.

Wang, W., et al.; "Investigating Memory Optimization of Hash-index for Next Generation Sequencing on Multi-core Architecture", IPDPSW IEEE 26th Inter. Conf., May 21-25, 2012, pp. 665-674, IEEE Computer Society, United States.

Cutt, B., et al.; "Improving Join Performance for Skewed Databases", IEEE, 2008, pp. 1-5, United States.

Li, Q., et al.; "Adaptively Reordering Joins during Query Execution", IEEE, 2007, pp. 26-35, United States.

Cleary, J.G., "Compact Hash Tables Using Bidirectional Linear Probing", IEEE Transactions on Computers, Sep. 1994, pp. 828-834, vol. C-33, No. 9, United States.

Nan Hua, H., et al., "Rank-Indexed Hashing: A Compact Construction of Bloom Filters and Variants", IEEE, 2008, pp. 73-82, United States.

Xu, Y., "A Multi-Dimesional Progressive Perfect Hashing for High-Speed String Matching", Seventh ACM/ IEEE Symposium on Architectures for Networking and Communications Systems, 2011, pp. 167-177, IEEE Computer Society, United States.

U.S. Appl. No. 14/509,336, "Embracing and Exploiting Data Skew During a Join or Groupby", filed Oct. 8, 2014, 38 pages, United States.

List of IBM Patents or Patent Applications Treated as Related Form; U.S. Appl. No. 14/671,664, filed Mar. 27, 2015; U.S. Appl. No. 13/753,769, filed Jan. 30, 2013; U.S. Appl. No. 14/471,272, filed Aug. 28, 2014; U.S. Appl. No. 13/753,740, filed Jan. 30, 2013; U.S. Appl. No. 14/471,079, filed Aug. 28, 2014.

Chinese Office Action dated Apr. 3, 2020 for Chinese Patent Application No. 201680015687.3 from China Patent Office, pp. 1-9, Beijing, China.

List of IBM Patents or Applications Treated as Related; Attaluri, G.K., U.S. Appl. No. 16/427,190, filed May 30, 2019.

Chinese Office Action dated Feb. 12, 2019 for Chinese Patent Application No. 201610177904.0 from Chinese Patent Office, pp. 1-8, Beijing, China.

List of IBM Patents or Patent Applications Treated as Related.

Japanese Office Action dated Sep. 3, 2019 for Japanese Patent Application No. 2017545567 from Japan Patent Office, pp. 1-8, Tokyo, Japan.

Chinese Office Action dated Dec. 5, 2018 for Chinese Patent Application No. 201610177904.0 from ChinesePatent Office, pp. 1-15, Beijing, China.

\* cited by examiner

FAST MULTI-TIER INDEXING SUPPORTING DYNAMIC UPDATE

BACKGROUND

Embodiments of the invention relate to data structure processing, in particular, for multi-tier indexing processing of data structures supporting dynamic update operations.

There is an increasing trend towards doing business intelligence (BI) queries on real-time data in databases or tabled data. Traditionally, there is a strict separation between BI systems and online transaction processing (OLTP) systems. There is increasing market pressure for operational BI, and for both transactions and analytics to be performed on the same database.

Trees, such as B+Trees, are the standard data structure used for indexing persistent data (mapping key to data records). They have many benefits, such as: supporting concurrent inserts, deletes, and lookups; are naturally organized in pages, and can gracefully spread across many layers of a memory-disk hierarchy, via buffer pools; there are known techniques to make inserts and deletes recoverable and atomic, in a transactional sense. However, the performance of tree data structures is much worse than that of in-memory hash tables, even when both data structures fit in memory.

SUMMARY

Embodiments of the invention relate to multi-tier indexing processing of data structures supporting dynamic update operations. One embodiment includes a method that includes performing a lookup using a key, by a hashing processor, into a root node of a multi-tier data structure, to find a partition for performing an insert operation. A lookup for the key is performed, by the hashing processor, on a first level index that is part of a linked data structure holding entries for the found partition. The hashing processor adds a payload or reference to the payload to the linked data structure based on data structure criterion, otherwise adding the key and the payload to the linked data structure if the key is not found. A data structure processor, based on data structure criterion, creates a new first level index and adds the new first level index to the linked data structure upon the linked data structure remaining unchanged since starting the lookup for the key, and adds the key and the payload or the reference to the payload to the new index. The data structure processor, based on a merge criterion, creates a new second level index and merges a portion of content from selected first level and second level indexes for combining into the new second level index.

These and other features, aspects and advantages of the present invention will become understood with reference to the following description, appended claims and accompanying figures.

DETAILED DESCRIPTION

Figure 1:
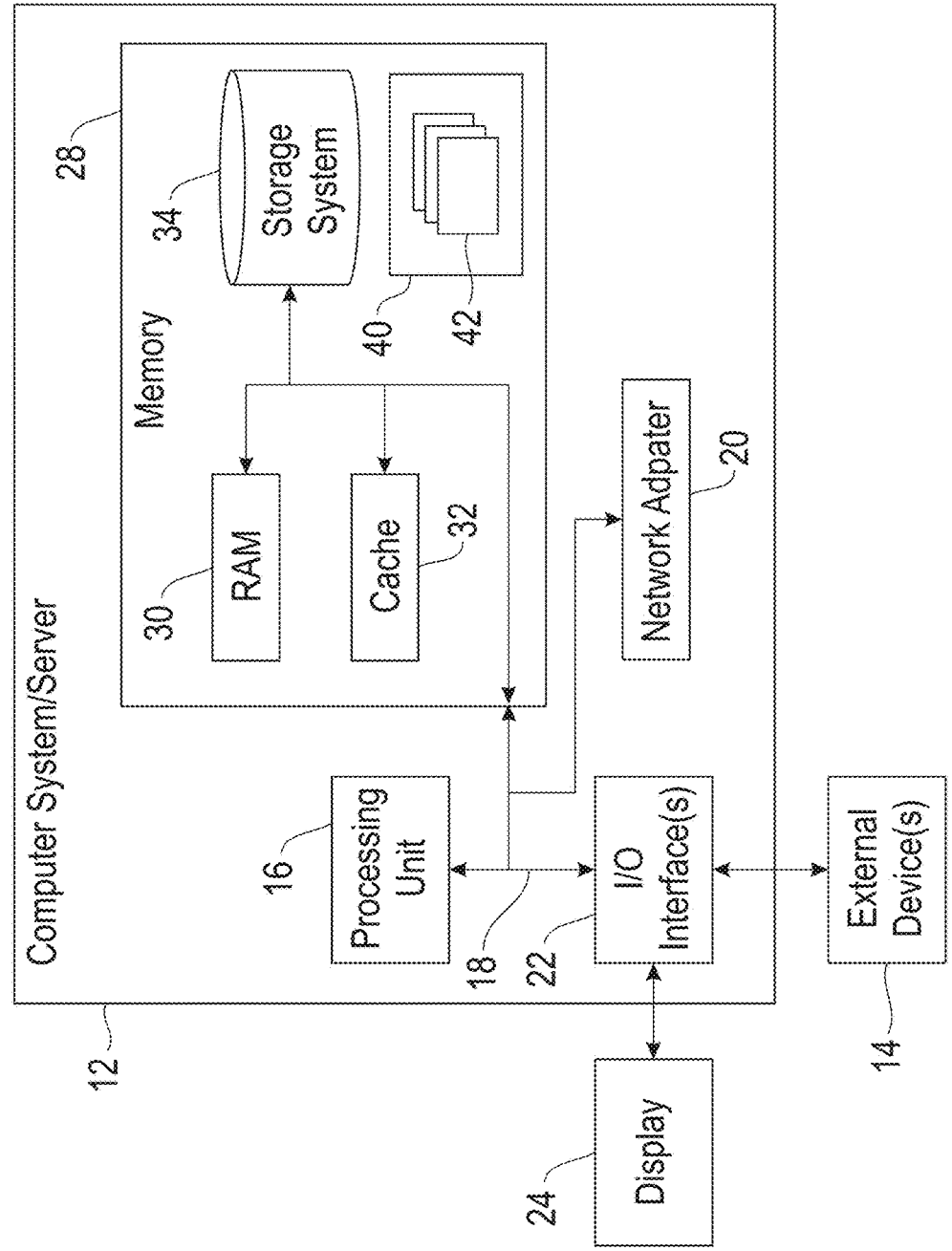
FIG. 1 depicts a cloud computing node, according to an embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include a(n) Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile/non-volatile media, and removable/non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in a memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via a network adapter 20. As depicted, the network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

Figure 2:
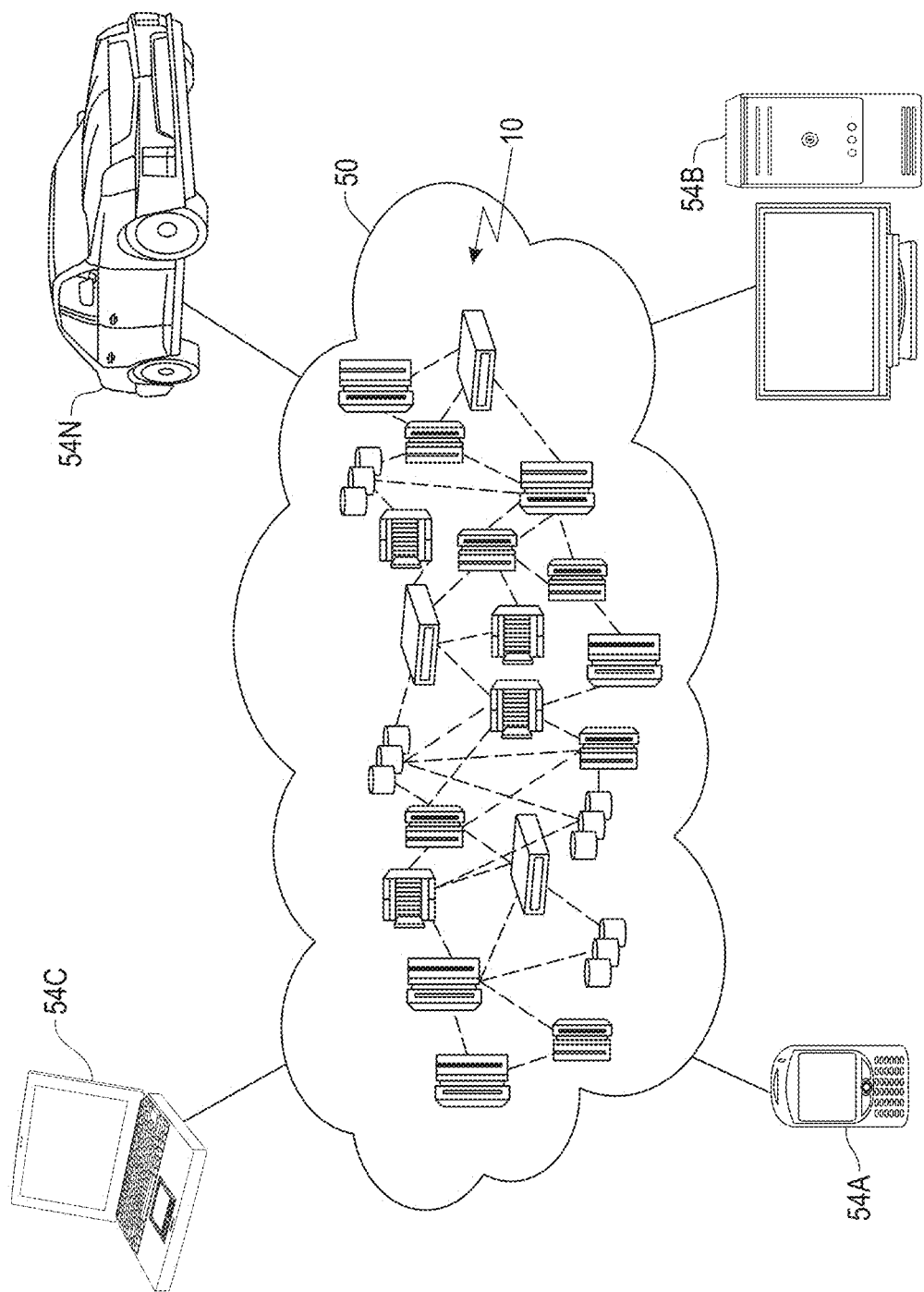
FIG. 2 depicts a cloud computing environment, according to an embodiment.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
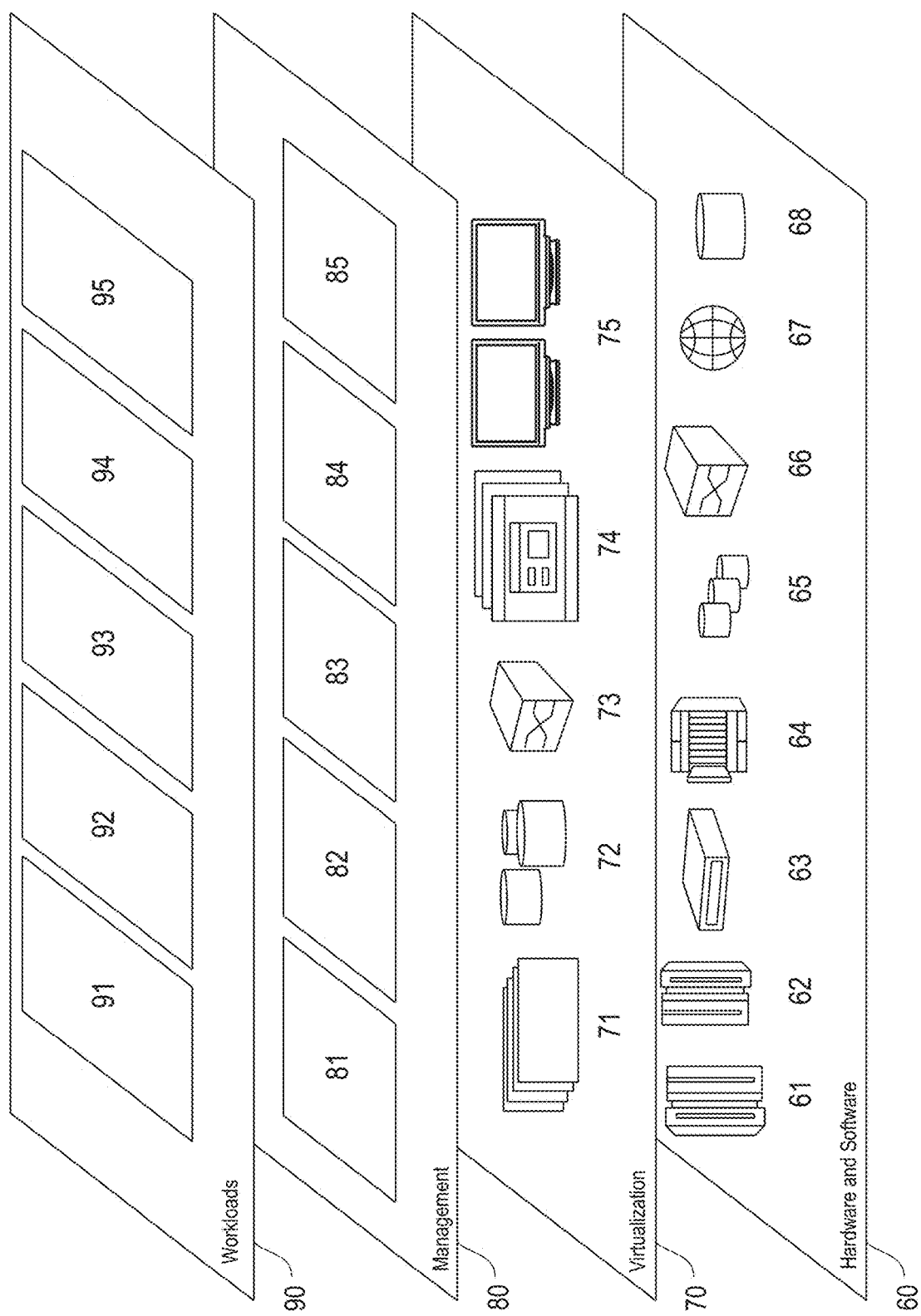
FIG. 3 depicts a set of abstraction model layers, according to an embodiment.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 3 are illustrative only, and the invention is not limited to these examples.

It is understood all functions of one or more embodiments as described herein may typically performed by the system 400 (FIG. 4), which can be tangibly embodied as modules of program code 42 of program/utility 40 (FIG. 1). However, this need not be the case. Rather, the functionality recited herein could be carried out/implemented and/or enabled by any of the layers 60, 70, 80 and 90 shown in FIG. 3.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

A hash table (HT) is made up of two parts: an array (the actual table where the data to be searched is stored) and a mapping function, known as a hash function. With a hash table, any value may be used as an index, such as a floating-point value, a string, another array, or even a structure as the index. This index is called the key, and the contents of the array element at that index is called the value. Therefore, an HT is a data structure that stores key/value pairs and can be quickly searched by the key. The hash function is a mapping from the input space to the integer space that defines the indices of the array. The hash function provides a way for assigning numbers to the input data such that the data can then be stored at the array index corresponding to the assigned number.

Embodiments of the invention relate to multi-tier indexing processing of data structures supporting dynamic update operations. One embodiment includes a method for doing inserts that includes performing a lookup, by a hashing processor, into a root of a multi-tier data structure. The lookup is performed with a key value derived from the value or record to be inserted. This lookup yields a partition for performing an insert operation. Within that partition, there is a linked data structure containing one or more indexes. A probe is performed, by the hashing processor, on a first level index of this linked data structure, to lookup the key. The hashing processor adds a payload to the first level index upon finding the key. Otherwise, if the key is not found, it adds the key and the payload to the first level index. If there is insufficient space to add the key, a data structure processor creates a new first level index and adds the new first level index to the linked data structure as a first entry, and adds the key and the payload to the new index. However, if the linked data structure has changed since the probe was started (for example, due to other concurrent insert operations), the probe is retried on the changed structure. If the amount of data in the first level indexes exceeds a threshold, the data structure processor creates a new second level index and merges content from selected first level and second level indexes into the new second level index.

One embodiment provides an index that maps a derived quantity based on a key value (e.g., a hash value computed from the key) onto a superset of the set of record locators of records that hold this key. Due to the mapping and updates, this payload is a superset, and may include non-matching entries (i.e., can have collisions) due to the mapping and updates. In one embodiment, a multi-tier system includes at the top/upper tier and a bottom/lower tier. In one example, at the top tier there is a memory-efficient data structure (e.g., a hash table), split internally into two levels. The first (root) level is an extendible-hashing like dictionary data structure that maps from a portion (usually a few prefix bits) of each derived quantity onto second level data structures. In one example, the size of the root is capped to fit onto a single page. The dictionary data structure supports lookup and insert operations, for example, a closed-addressing (chaining) hash table. The second level is a fixed-size dictionary data structure. In one example, the fixed-size dictionary data structure is set to be a single page. The top tier has an efficient in-memory dictionary for fast lookups and inserts, but may not be space efficient.

In one embodiment, the lower tier dictionaries are used when the index becomes too large for the top tier. When both the root level and one dictionary on the second level are full, the entire full second-level page is migrated to the lower tier. To do so, it is merged with any existing lower tier dictionary for that second level child, forming a new lower tier dictionary (or a new lower tier dictionary may be directly created if this is the first time). The lower tier dictionaries are immutable and do not support insert or delete operations. This provides for using very compact and efficient data structures. For example, a complete sort by key may be performed and a perfectly balanced tree data structure may be built. Or a compact hash table data structure may be built, such as perfect hashing, cuckoo hashing, or compact hash tables.

In one embodiment, the index maps hash values to a set of tuple sequence numbers (TSNs, also referred to as a tuple or row identifier). Neither the key (only its hash value) nor any other attributes are stored in the index itself. This approach also reflects main-memory and OLTP optimized design, where having a clustered index is of little benefit. Not storing any keys or attributes in the index allows index pages to have the same layout in memory, independent of their types. One embodiment supports systems that use multi-version concurrency control, and both row and column-wise storage. In one example, the index has the following interface:

uint64 lookup(uint64 hash, uint64*resultBuffer, uint64 resultBufferSize)
insert(uint64 hash, uint64 tsn)
delete(uint64 hash, uint64 tsn).

In one embodiment, the lookup function takes a hash value, a result buffer, and its maximum size as input parameters. The return value is the number of TSNs found for the desired hash key. If the result buffer is too small, the caller must allocate a larger buffer and retry the lookup. The lookup and delete functions both take a hash value and a TSN. This interface allows the index to be used for unique and non-unique indexes.

Figure 4:
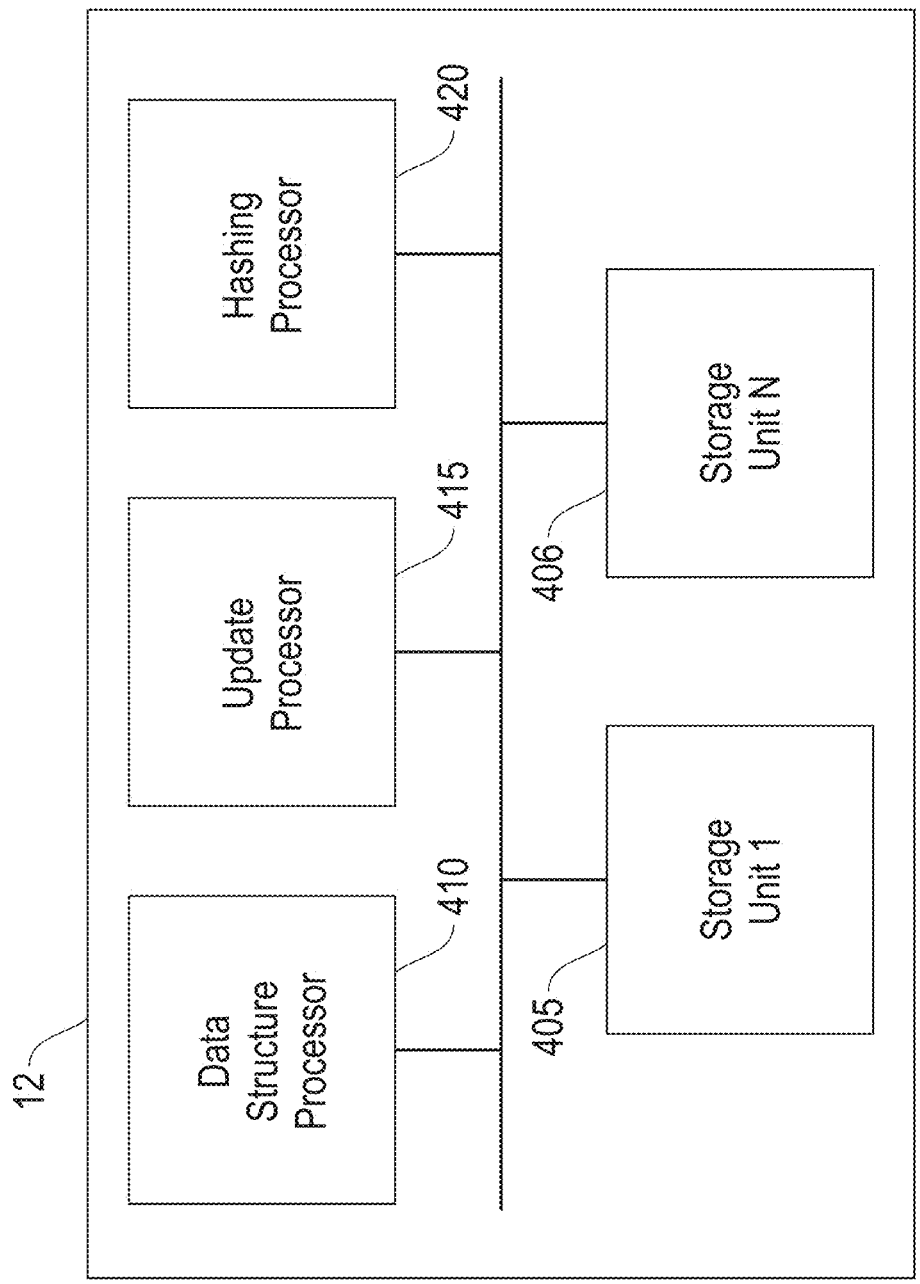
FIG. 4 is a block diagram illustrating a system for multi-tier indexing processing of data structures supporting dynamic update operations, according to an embodiment.

FIG. 4 is a block diagram illustrating a system 400 for multi-tier indexing processing of data structures supporting dynamic update operations, according to an embodiment. In one embodiment, the system 400 includes a server 12 including a storage unit 1 405 through storage unit N 406 (where N is an integer greater than 1), a data structure processor 410, an update processor 415, and a hashing processor 420. In one embodiment, the storage units 1-N 405-406 may be external to the server 12. In one embodiment, the storage units 1-N 405-406 may store objects, such as rows/columns/individual values, tables, etc. In a relational database, a table (or file) organizes the information about a single topic into rows and columns. In one embodiment, the storage units 1-N 405-406 may include different types of memory storage, such as a buffer pool, cloud based storage, different types of objects pools, etc.

Figure 13:
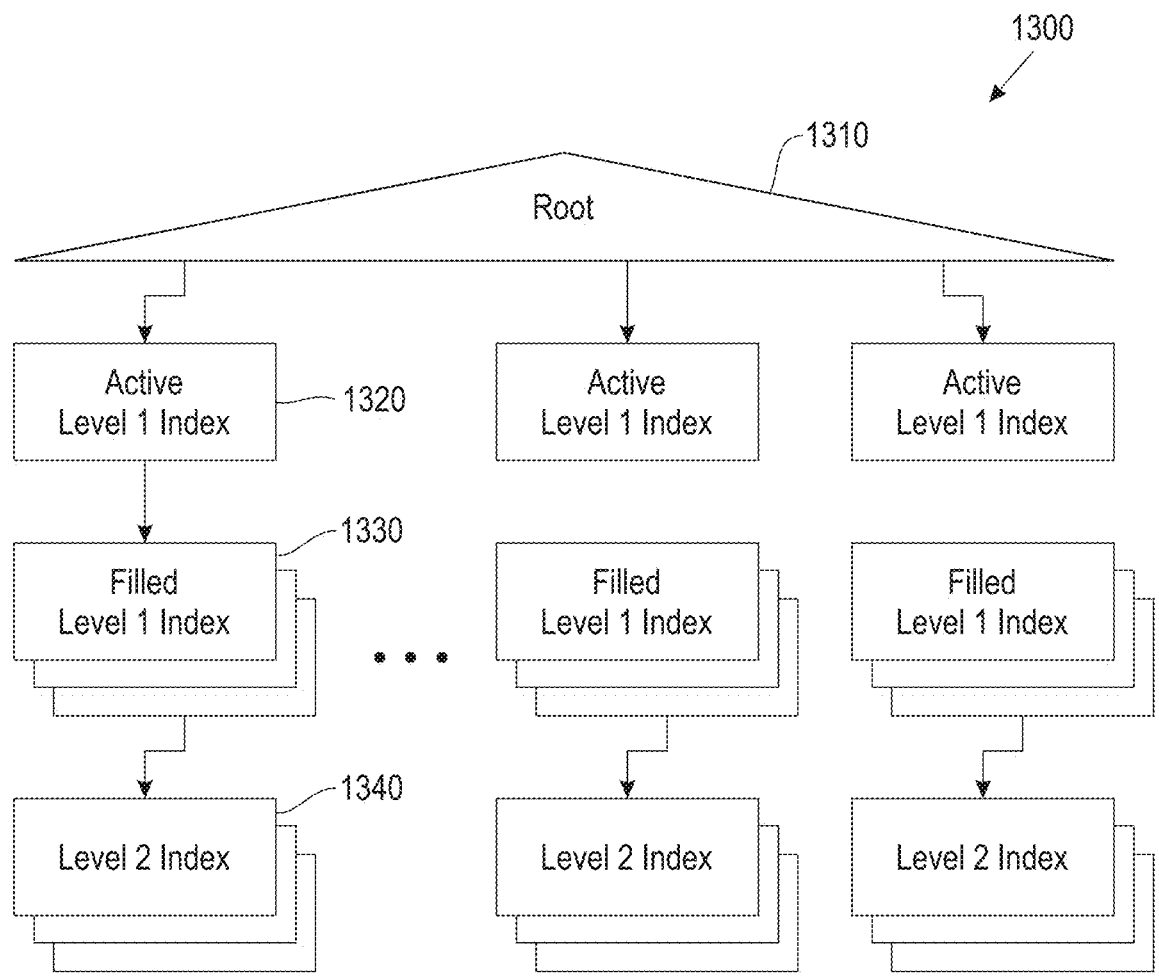
FIG. 13 illustrates an index hierarchy, according to an embodiment.

In one embodiment, the data structure processor 410 performs processing on a hierarchical data structure that includes root nodes and multi-levels of indexes (see, FIG. 13). The update processor 415 provides update processing that includes updating linked data structures (e.g., linked lists) by replacing merged indexes with the new indexes. In one embodiment, the hashing processor performs probes, lookups, and adds keys and payloads to the indexes in the linked data structures.

A hash table has very different requirements and performance characteristics depending on the number of entries in it. Some of these requirements are in conflict with each other. For example, it is more expensive to insert into compact hash tables than into data structures that are more generous with space. Hash tables that grow by doubling have good insert performance at the cost of high worst-case latency. No single data structure will work well in all cases. Therefore, in one embodiment, a hash index uses multiple different structures and dynamically adapts its internal structure to be able to achieve good overall characteristics. In one embodiment, for small and medium sized indexes, extendible hashing is used to grow the index smoothly by splitting index pages. A chaining hash table stores a fixed number of (hash, TSN) pairs and allows for in-place inserts and deletes. For large indexes, a compact hash table is implemented. In one embodiment, a variant of the concise hash table is implemented and stores the majority of all entries compactly.

Figure 5:
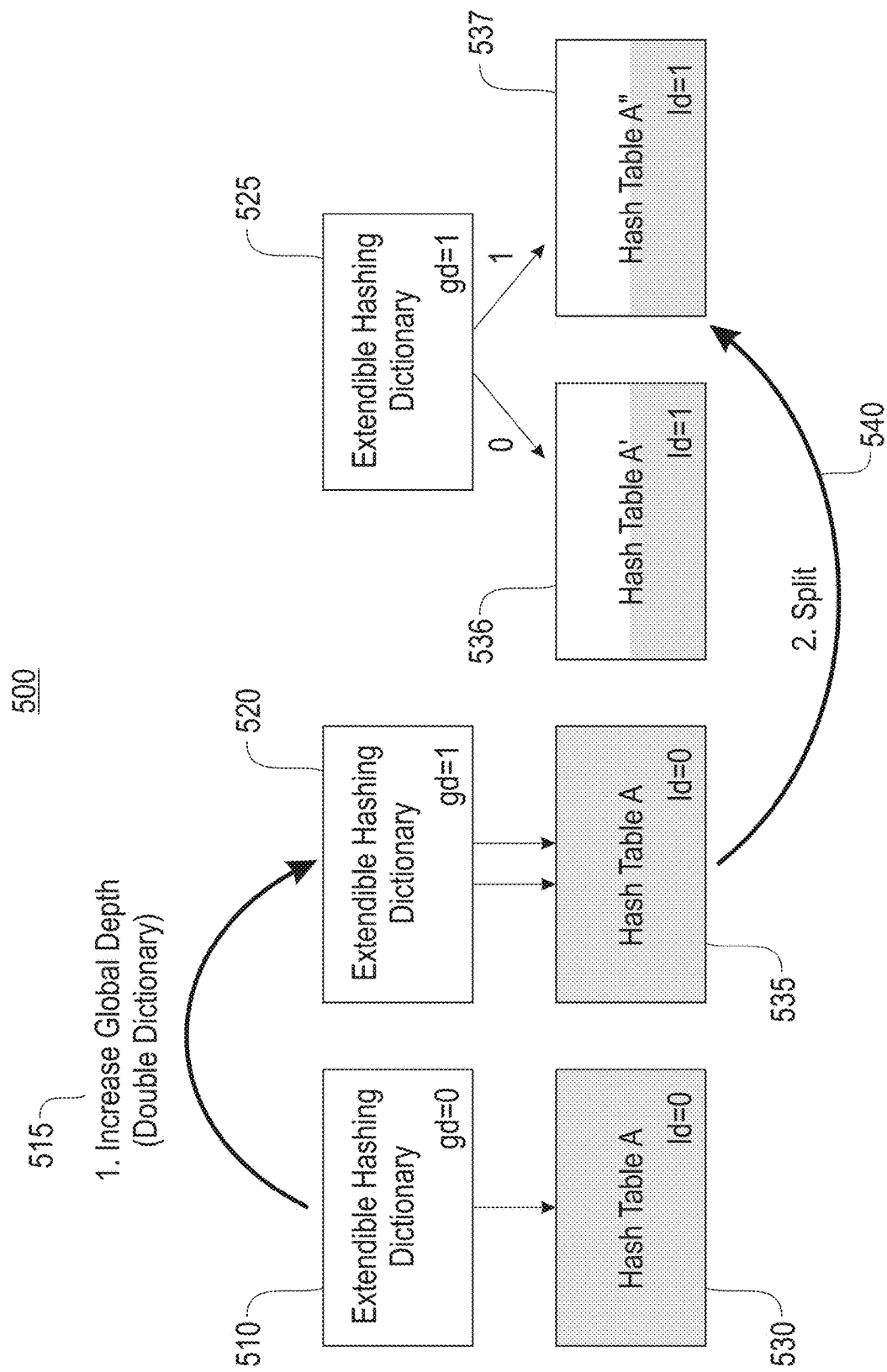
FIG. 5 illustrates an extendible hashing example for a global depth of 1, according to an embodiment.

FIG. 5 illustrates an extendible hashing example 500 for a global depth of one (1), according to an embodiment. Extendible Hashing is a technique for growing hash tables. In one embodiment, extendible hashing is used for small and medium sized indexes with less than 10 million entries. The root page of the hash index consists of the dictionary structure of extendible hashing, which is an array of pointers to hash table pages. In one example, the size of the dictionary is always a power of two, the logarithm of which is known as global depth. Index operations can very efficiently jump directly to the next level by using global depth bits of the hash as an index into the dictionary. In the initial state, shown by the extendible hashing dictionary 510 and hash table A 530, the extendible hashing dictionary 510 has global depth of zero (0) (i.e., size 1), and is pointing to one index page of hash table A 530.

In one example, if the index page of hash table A 530 becomes full, the dictionary needs to grow by doubling its size by increasing the global depth at 515, and indicated by extendible hashing dictionary 520 with global depth of one (1). In this temporary state both pointers are still pointing to the same (full) page of hash table A 530. In the second step, the index page is split at 540 into two pages (hash table A' 536 and hash table A" 537) by assigning entries to one of the two new pages depending on the first bit of the hash key. Finally, the two new pointers are installed in the extendible hashing dictionary 520.

Once the page of hash table A' 536 becomes full, again the extendible hashing dictionary 520 is doubled and the page is split to arrive at the state with the page of hash table A' 536 and the page of hash table A" 537. At this point, the page of hash table A" 537 can be split without doubling the extendible hashing dictionary 520, as there are multiple pointers pointing to it. To find out if an extendible hashing dictionary needs to grow or not, the local depth (abbreviated as "ld") is stored at each page. If the local depth of a page is equal to the global depth ("gd"), there is only one pointer to this page, thus the extendible hashing dictionary 510 must grow first. As shown, Hash table A' 536 has local depth of 2 and the global depth is 1, so the extendible dictionary 520 does not need to grow.

One advantage of extendible hashing is that it is extremely fast; a lookup merely consists of using a number of hash bits as an index into the dictionary array. Additionally, in one example embodiment, extendible hashing allows for low overhead synchronization because modifications to the extendible hashing dictionary are very infrequent. It should be noted that for very large indexes, doubling the dictionary eventually becomes an expensive, high-latency operation. In one example, however, this is not a problem when only using the extendible hashing up to the point where the dictionary fills up one page. With 32 KB and 8B pointers, for example, the maximum extendible hashing fanout is 4096. After that, for large indexes, the dictionary keeps this maximum size and, in effect, acts as initial hash partitioning of large indexes into more manageable chunks.

Figure 6B:
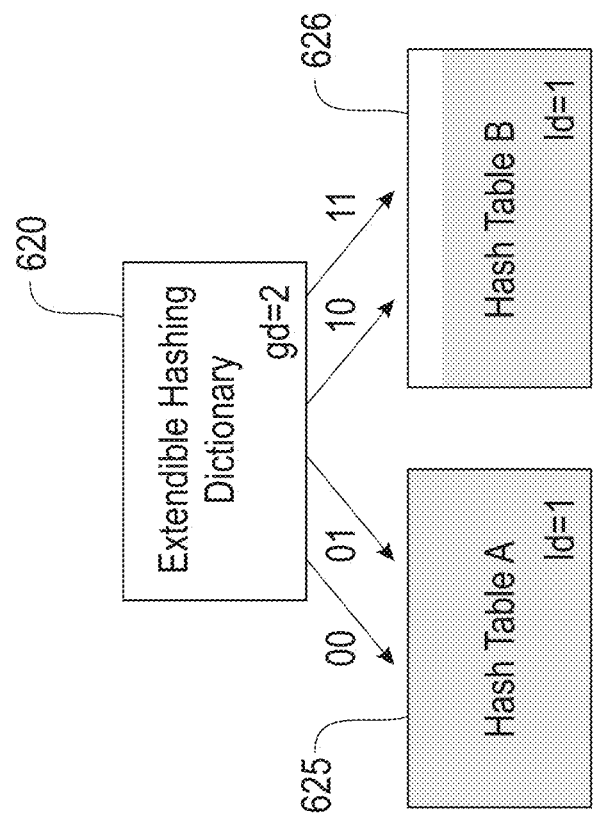
FIGS. 6A-C illustrate extendible hashing examples for a global depth of 2, according to an embodiment.
Figure 6A:
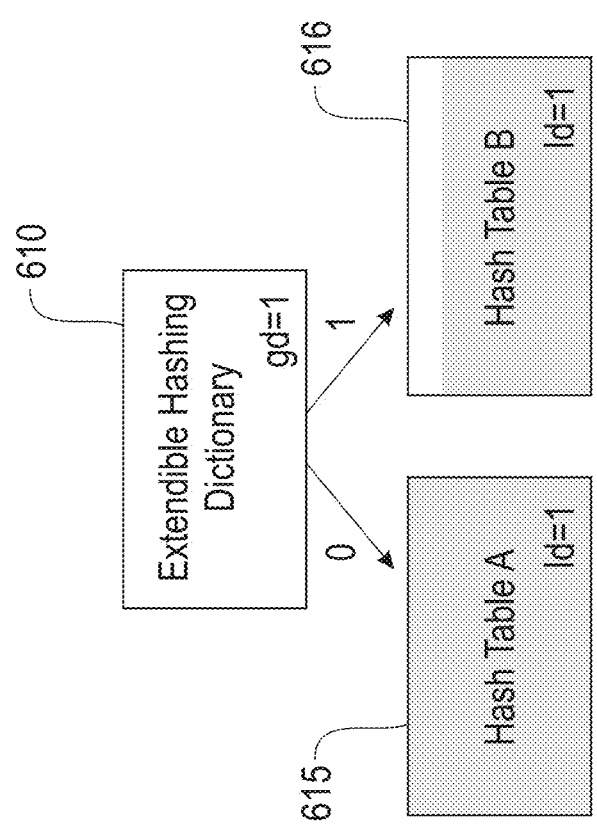
Figure 6C:
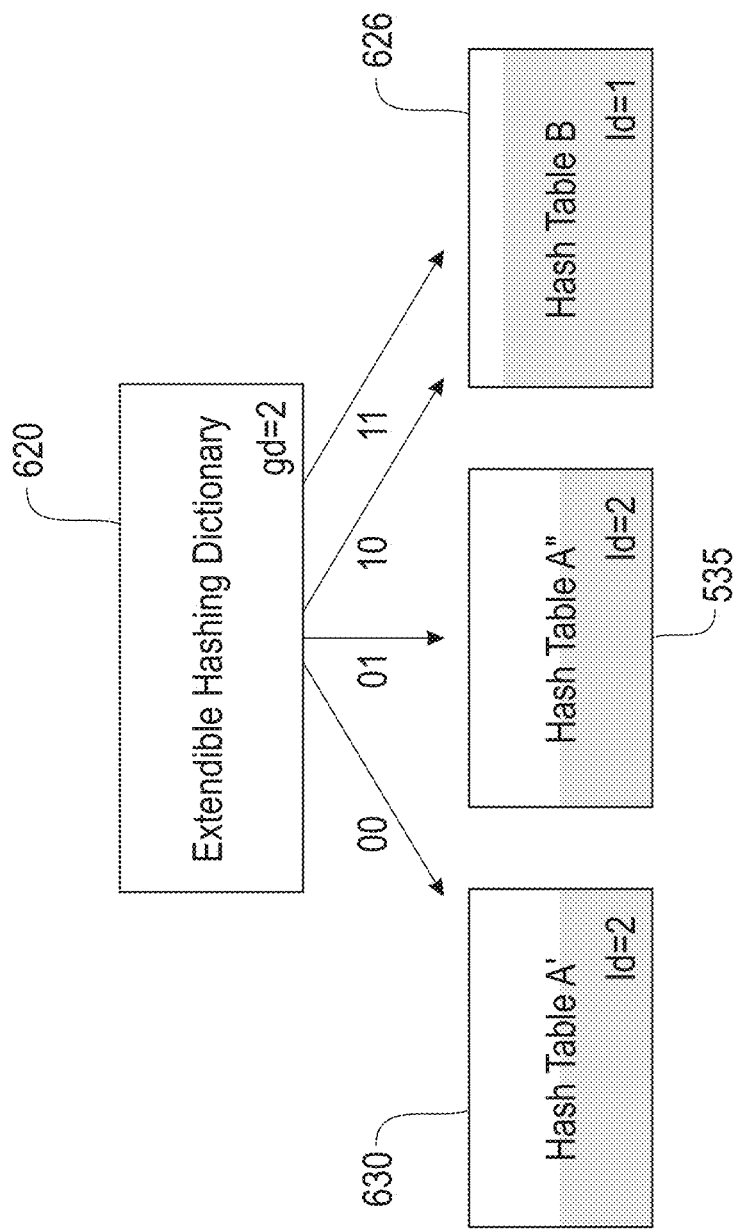

FIGS. 6A-C illustrate extendible hashing examples for a global depth of two (2), according to an embodiment. As shown in FIG. 6A, the extendible hashing dictionary 610 has a global depth of one (1) and is pointing to the page of hash table A 615 and a page of hash table B 616, each with a local depth of 1. In FIG. 6B, the extendible hashing dictionary 620 has a global depth of two (2) and has two pointers into a page of hash table A 615 and two pointer into a page of hash table B 616. In FIG. 6C, the extendible hash table 620 has the array doubled, which results in splitting the hash table A 615 into hash table A' 630 and hash table A" 635, each with a local depth of two (2). This results with a pointer from the extendible hashing table 620 to a page of hash table A' 630, a pointer into a page of hash table A" 635, and the two pointers remain into a page of hash table B 616.

Figure 7:
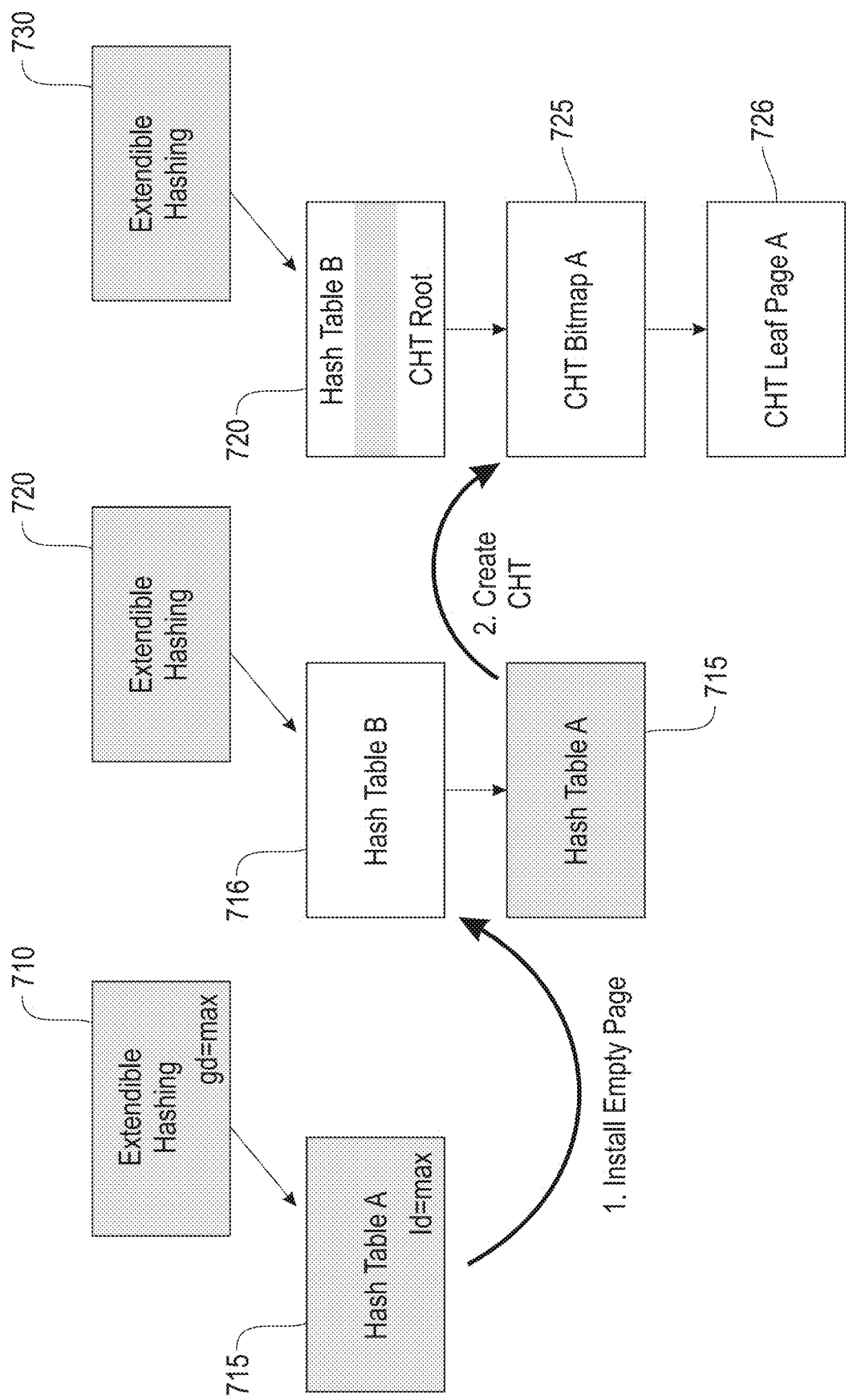
FIG. 7 illustrates a concise hash table (CHT) used in extendible hashing, according to an embodiment.

FIG. 7 illustrates a concise hash table (CHT) used in extendible hashing, according to an embodiment. In most databases, the table size distribution is highly skewed, and a single or a handful of tables and their indexes dominate the total space consumption. Therefore, for large indexes, space consumption becomes a critical factor. Most dynamic indexing data structures, including extendible hashing, linear hashing, and B-Trees, grow by splitting pages. As a result, pages are only about 75% full on average, and additional space is often wasted to allow for fast lookups and in-place updates. Therefore, once an index has reached the maximum extendible hashing fanout (e.g., 4096), splitting of pages is stopped, and instead a more compact data structure is introduced.

The Concise Hash Table (CHT) was originally proposed for space-efficient hash joins and allows for fast bulk construction and efficient lookups. By not allowing for in-place updates and deletes, it may pre-compute a perfect layout that wastes no space. The CHT structure is introduced below the extendible hashing dictionary 710 and one chaining page of hash table B 716 and includes CHT bitmap page A 725 and CHT leaf page A 726. For large indexes, the vast majority of the data will be stored compactly in the CHT. The chaining hash table B 716 above the CHT structure becomes a staging area for changes. As shown in FIG. 7, the CHT consist of two levels, bitmap pages (e.g., CHT bitmap page A 725) and leaf pages (e.g., CHT leaf page A 726).

The hash partitioning of the extendible hashing dictionary 710 at the root of the index keeps the size of each CHT manageable. For example, each CHT partition of an index with 10 billion entries (80 GB in size) is only about 22 MB. Additionally, the fanout of the extendible hashing dictionary 710 enables parallelism. While the CHT structure has very good performance in main memory, it also behaves well if the leaf level is evicted to disk or SSD. The bitmap pages serve as a bloom filter that allows to avoid unnecessary accesses. Furthermore, similar to Log-Structured Merge-Trees, multiple writes are combined in the chaining hash table. This replaces frequent random I/O with much more efficient sequential I/O.

In one example, the page of hash table A 715 has a maximum local depth. An empty page is installed in hash table B 716. Then the CHT is created with hash table B 716 as the root of the CHT, which includes the CHT bitmap page A 725 and CHT leaf page A 726. To summarize the growth process of the index: initially, the index grows horizontally and the extendible hashing fanout increases at the root page. The root page only contains pointers to chaining hash tables, each of which has a fixed size and is stored on a single page. This approach is similar to a B+Tree with two levels, except that extendible hashing avoids explicit separator keys and binary search at the root node. Once the maximum extendible hashing fanout is reached, the index starts growing vertically by periodically merging index entries into a CHT.

In one embodiment, the chain array stores indexes into the entry array. Each entry stores another index next for the next entry in the chain of a special value to indicate the end of the list. At the front of the page a number of fields are stored that are only used during insertion and deletion. In one example, a lookup uses 12 hash bits to load the start of the chain. Since the chain array has 4096 entries, storing of 12 bits can be avoided.

Figures 8A, 8B, 8C:
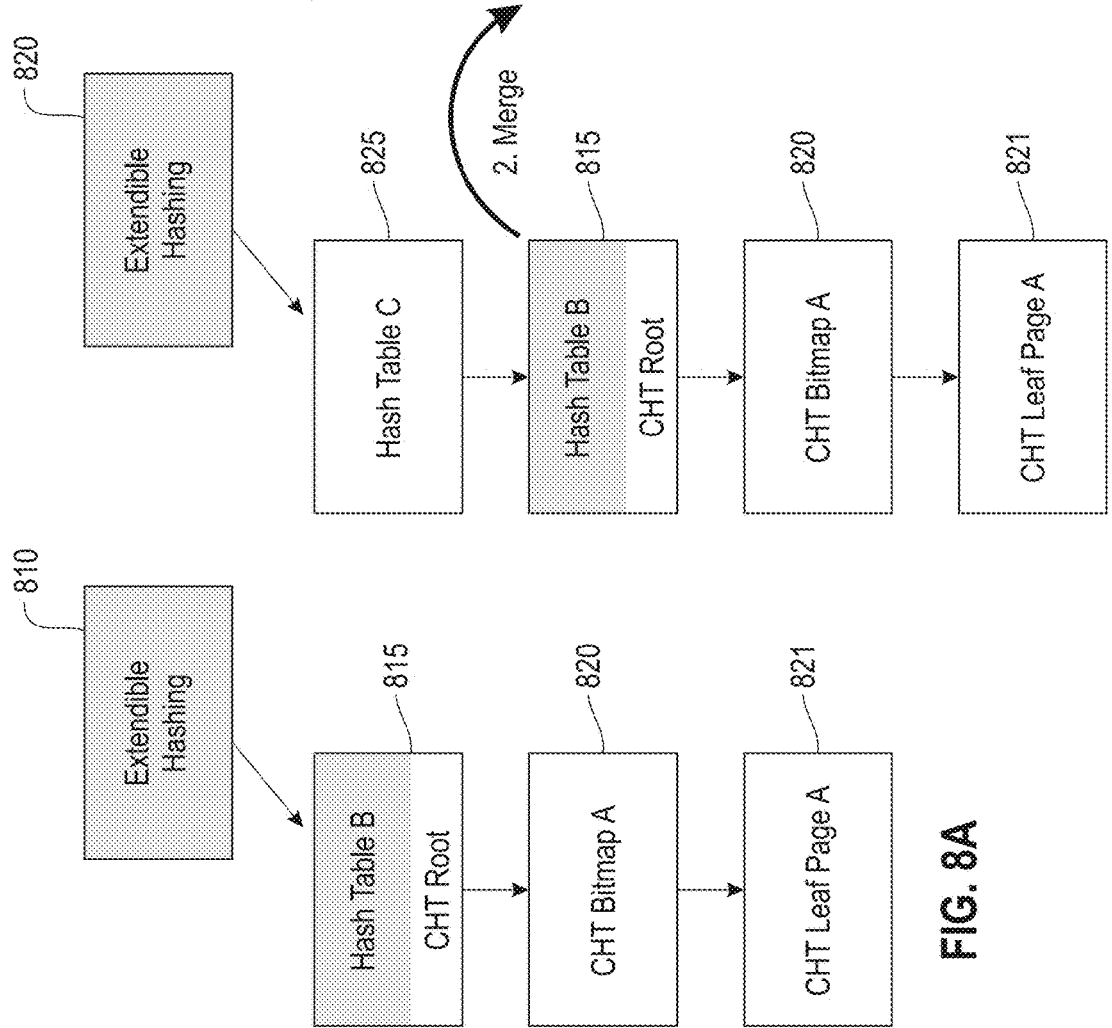
FIGS. 8A-C illustrate CHT extendible hashing examples for where the CHT includes two levels (bitmap pages and leaf pages), according to an embodiment.

FIGS. 8A-C illustrate CHT extendible hashing examples where the CHT includes two levels (bitmap pages and leaf pages), according to an embodiment. In FIG. 8A, the chain includes the extendible hashing dictionary 810, the hash table B 815 (the root of the CHT) and the CHT including the CHT bitmap page A 820 and CHT leaf page A 821. FIG. 8B shows growing of the chain with a page of hash table C 825. In one example, the page of hash table B 815 is merged as shown in FIG. 8C, where hash table C 825 is the root for the merged CHT. The merged CHT includes the CHT bitmap page AB 840 and CHT leaf page AB 841.

Figure 9:
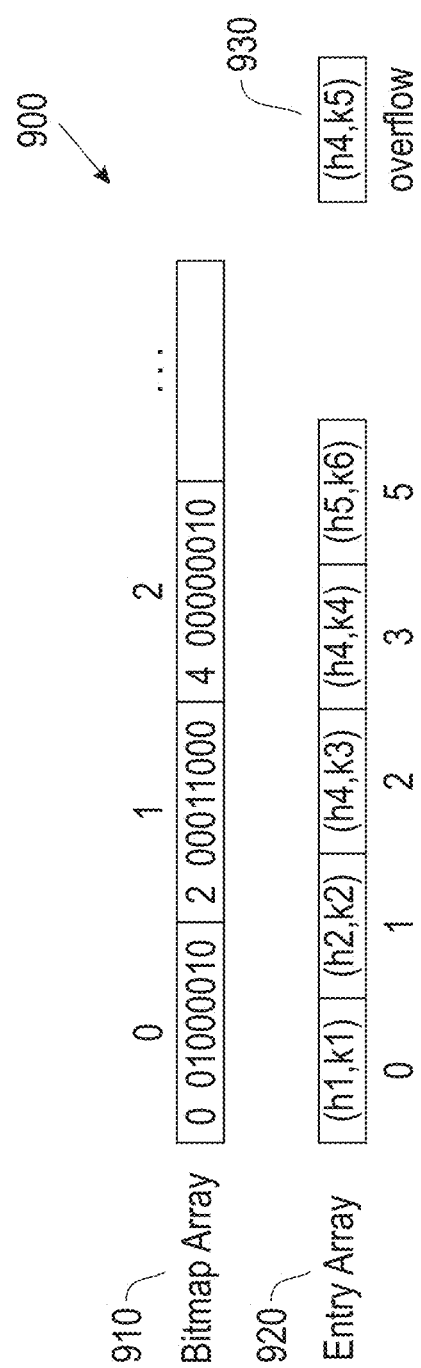
FIG. 9 illustrates a CHT that may be implemented, according to an embodiment.

FIG. 9 illustrates a concise hash table (CHT) 900 that may be modified by an embodiment. The CHT 900 as a compact data structure. The CHT 900 achieves space efficiency by storing entries in a dense, and mostly sorted array. In one example, the CHT 900 includes a bitmap array 910, an entry array 920 for the actual values, and an overflow data structure 930 (e.g., a different kind of hash table). The bitmap array 910 is sized such that about 1 in 8 bits are set, and is split into buckets storing 32 bits (e.g., for graphical reasons 8 bits per bucket are used in the example). By looking at an appropriate number of hash bits of an entry one can determine its bit position in the array. Conceptually, its position in the entry array can then be computed by adding up the number of bits set (population count) left to its position. Since it is not practical to actually compute the population count over many buckets on every lookup, prefix population counts are interleaved with the bitmap array. In the example, the prefix population for the bucket 2 is 4, because the bucket 0 and the bucket 1 both have 2 entries in the entry array 920. This allows to quickly find the likely position of an entry. In case of a hash collision (e.g., h4 in the example), the neighboring bit (and therefore also position) is used. However, if more than two entries hash to the same bit position, these entries must be stored in a separate data structure, as shown in the example for h4.

The original CHT 900 data structure was designed for space-efficient in-memory hash joins. Therefore, both the bitmap array 910 structure and the entry array 920 are simply large arrays. Since the index is arranged on fixed-sized pages, in one embodiment the CHT 900 is modified. In one embodiment, leaf page pointers are interleaved within the bitmap array 910 in the same way as the prefix counts. To make space for this additional information, in one embodiment the size of each bitmap is increased from 32 to 64 bits. As a result there are 64 bits per bucket, of which 48 are used for leaf pointers and 16 are used for prefix counts. All entries that hash to a bitmap bucket are stored on the same leaf. Further, the prefix count is now relative to the beginning of the leaf, which is why 16 bits for it are sufficient. When building the data structure, as many consecutive bitmap buckets as possible are assigned to a leaf. As a result usually all but the last leaves are almost full.

In one embodiment, another modification to the CHT 900 concerns how over-flows, which occur due to duplicate keys or hash collisions, are handled. In one embodiment, the original CHT 900 scheme is optimized for unique keys: once both possible locations for an item have been taken, this entry was stored in a totally different data structure. In one example, an approach is used that keeps overflow entries close to regular entries. As a result, in one embodiment, the hash index works well not only for unique keys, but also when there are multiple TSNs per key.

In one example, the 39 bits of the hash and a 48 bit TSN are stored. These values are optimized for 32 KB pages and 8B pointers: Extendible Hashing pre-determines 12 hash bits (due to a fanout of 4096), and the modified CHT 900 bitmap page predetermines an additional 11 bits (due to 2048 buckets). As a result, 23 bits of the hash can be "compressed," so that each leaf page entry only has to store the remaining 16 bits. If the 48 bit TSN bits are added, each leaf entry is only 8 bytes in total.

Figure 10:
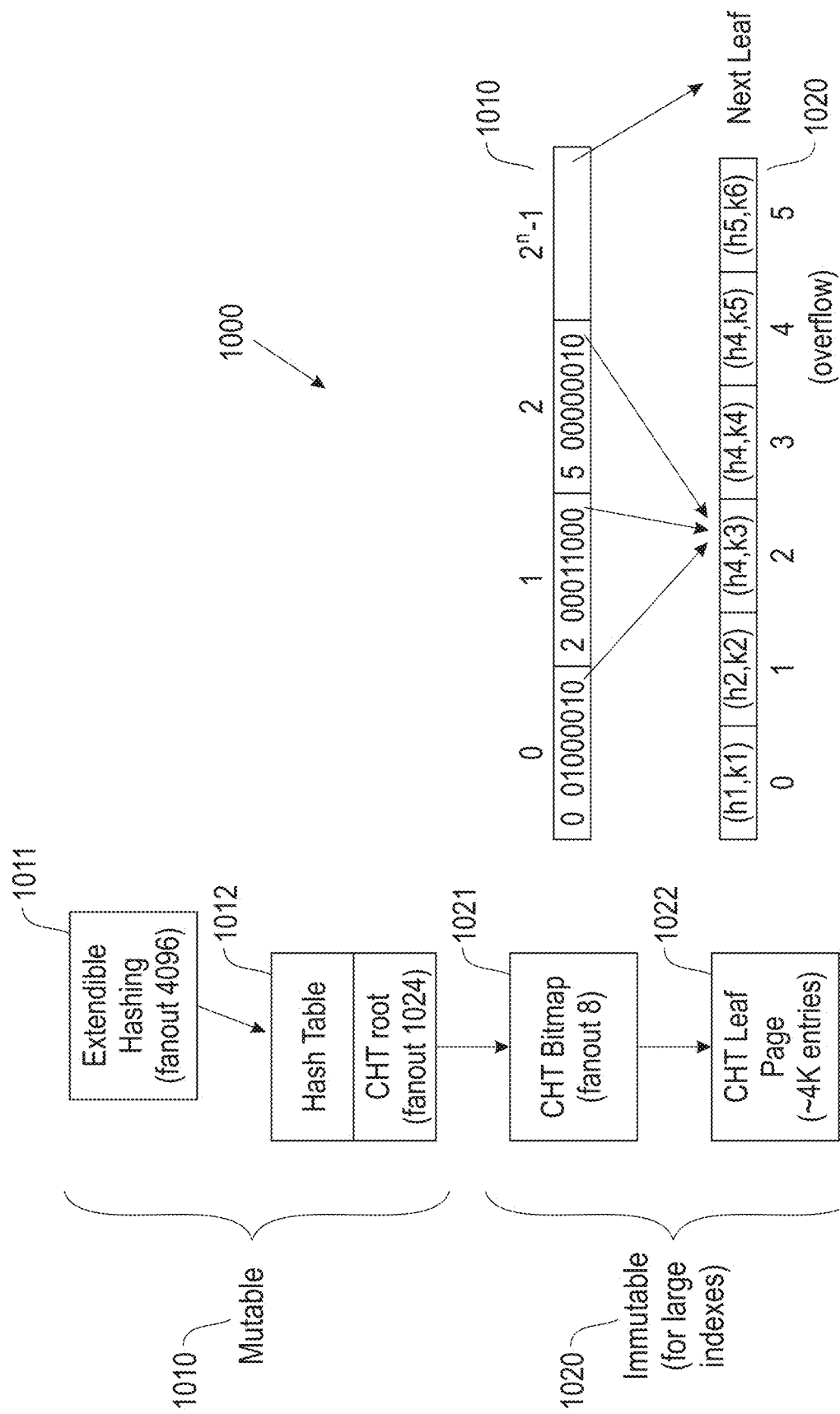
FIG. 10 illustrates an example two-tier data structure, according to an embodiment.

FIG. 10 illustrates an example data structure 1000, according to an embodiment. In one embodiment, the data structure 1000 includes a mutable tier 1010 that includes extendible hashing 1011, and a hash table 1012, and an immutable tier 1020 that includes a CHT bitmap 1021 (e.g., modified bitmap array 910) and a CHT leaf page 1022. In one embodiment, leaf page pointers are interleaved within the bitmap array 910 in the same way as the prefix counts. To make space for this additional information, in one embodiment the size of each bitmap is increased from 32 to 64 bits. As a result there are 64 bits per bucket, of which 48 are used for leaf pointers and 16 are used for prefix counts. All entries that hash to a bitmap bucket are stored on the same leaf. Further, the prefix count is now relative to the beginning of the leaf, which is why 16 bits for it are sufficient. When building the data structure, as many consecutive bitmap buckets as possible are assigned to a leaf. As a result usually all but the last leaves are almost full.

In one embodiment, another modification to the CHT 900 concerns how over-flows, which occur due to duplicate keys or hash collisions, are handled. In one embodiment, the data structure 1000 scheme is optimized for unique keys: once both possible locations for an item have been taken, this entry was stored in a totally different data structure. In one example, an approach is used that keeps overflow entries close to regular entries. As a result, in one embodiment, the hash index works well not only for unique keys, but also when there are multiple TSNs per key.

In one example, the 39 bits of the hash and a 48 bit TSN are stored. These values are optimized for 32 KB pages and 8B pointers: Extendible Hashing pre-determines 12 hash bits (due to a fanout of 4096), and the modified CHT 900 bitmap page predetermines an additional 11 bits (due to 2048 buckets) in the data structure 1000. As a result, 23 bits of the hash can be "compressed," so that each leaf page entry only has to store the remaining 16 bits. If the 48 bit TSN bits are added, each leaf entry is only 8 bytes in total.

Figure 11:
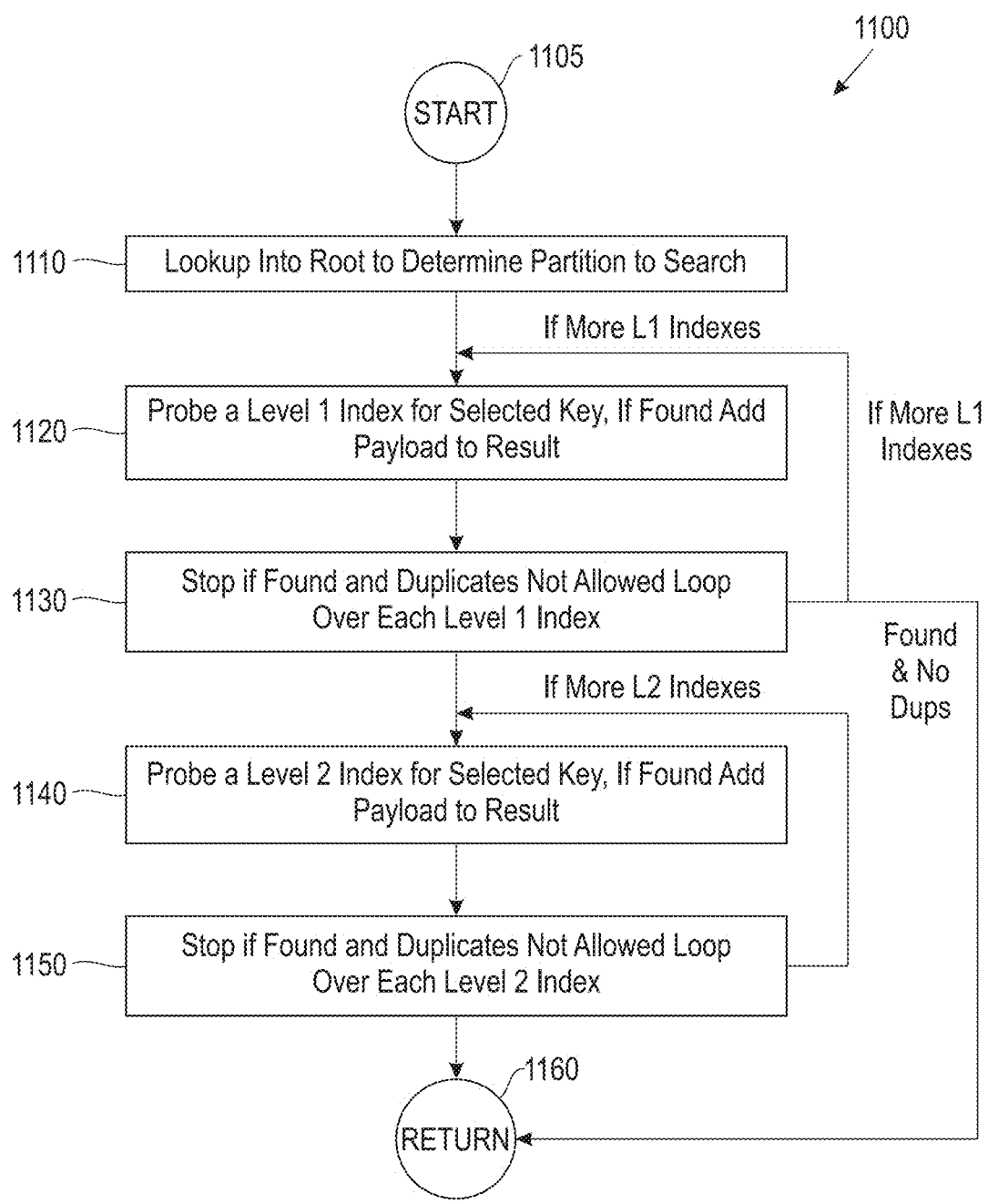
FIG. 11 illustrates a process for an index lookup process, according to an embodiment.

FIG. 11 illustrates a process 1100 for an index lookup process, according to an embodiment. In one embodiment, process 1100 commences at block 1105 and continues to block 1110. In block 1110 a lookup operation is performed into a root (e.g., FIG. 13, root 1310) index data structure to determine a partition to search/insert. In block 1120, a probe operation is performed for a first level (level 1) index for a selected key. If the key is found the payload is added to the result. Process 1100 proceeds to block 1130, where the process 1100 stops by proceeding to return 1160 if the key was found (in block 1120) and duplicates are not allowed. A loop over each first level (level 1) index is made (i.e., return to block 1120) if there are more first level indexes.

In block 1140, a probe is performed for a second level (level 2) index for the selected key. If the key is found it is added to the payload result. Process 1100 continues to block 1150 where the process 1100 stops by proceeding to block 1160 if the key was found and duplicates are not allowed. A loop over each second level (level 2) index is made (i.e., return to block 1140) if there are more first level indexes, otherwise the process 1100 exits at block 1160.

Figure 12:
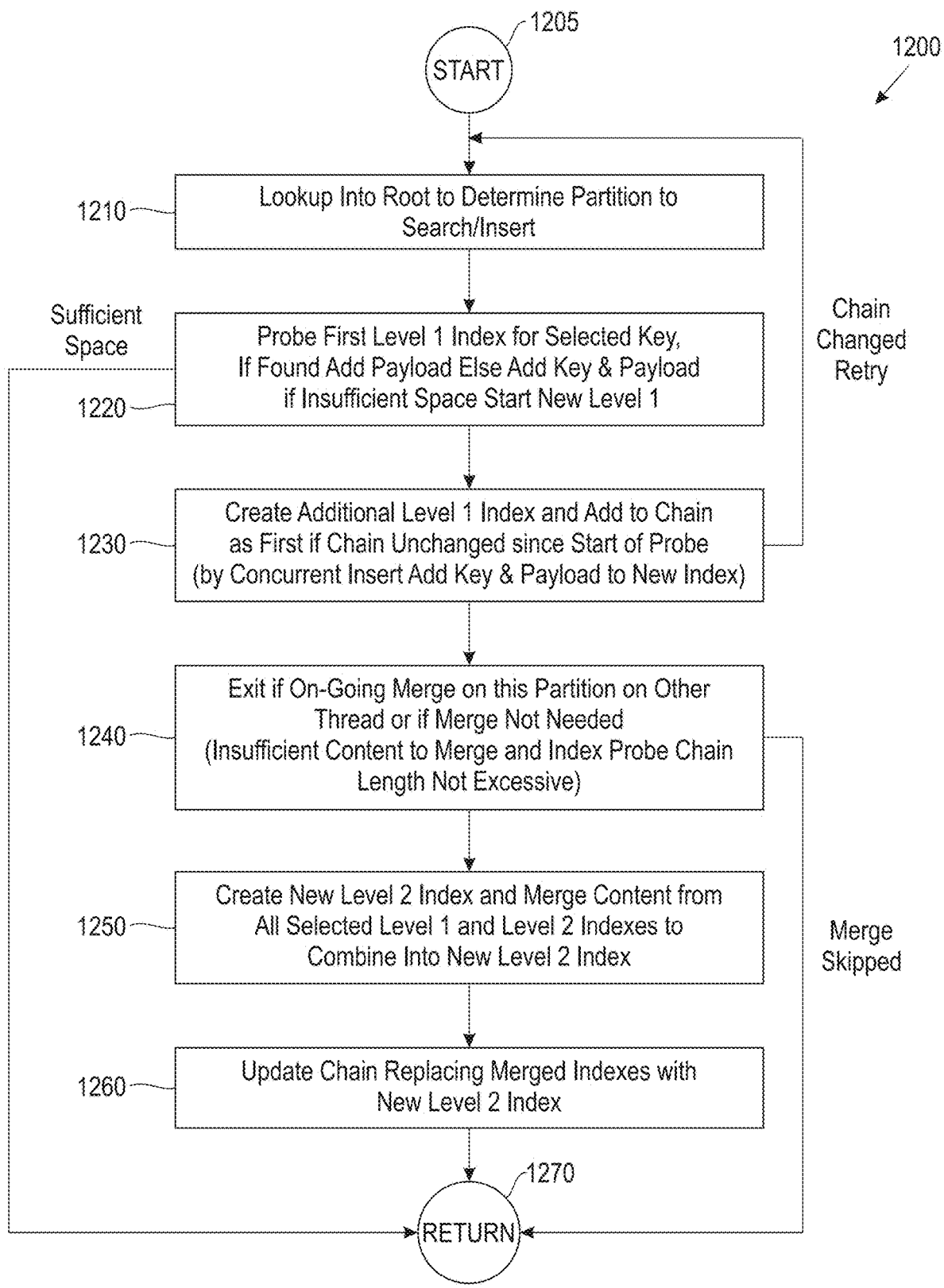
FIG. 12 illustrates an insert into an index process, according to an embodiment.

FIG. 12 illustrates an insert into an index process 1200, according to an embodiment. Process 1200 commences at block 1205 and proceeds to block 1210. In one embodiment, in block 1210 a lookup is performed into a root (e.g., FIG. 13, root 1310) data structure to determine a partition to search/insert. In block 1220, a probe operation is performed on the first level (level 1) index for a selected key. If the key is found, the payload is added to the first level index. Otherwise, the key and a payload are added to the first level index. If there is sufficient space in the first level, the process stops at block 1270. Otherwise, if there is insufficient space, a new first level index is started (created) in block 1230.

In block 1230, the additional first level index is created and added to the linked data structure for the partition, as a first index, if the linked data structure is unchanged since the start of the probe operation block 1220 by a concurrent insert. If the linked data structure has changed since the probe operation, the process continues back to block 1210 for a retry. Otherwise, the key and payload are added to the new index. Process 1200 continues to block 1240 which exits to block 1270 if an on-going merge on the determined partition on another thread occurs, or if a merge is not needed (e.g., there is insufficient content to merge, or the number of indexes to be probed is not excessive). Process 1200 continues to block 1250 where a new second level (level 2) index is created, and the content from all selected first and second level indexes are merged into the new second level index. In block 1260, an update operation is performed by updating the linked data structure by replacing merged indexes with the new second level index. Process 1200 then exits via block 1270.

FIG. 13 illustrates an index, according to an embodiment. In the index 1300, the root 1310 points to the array of active level 1 indexes 1320, which is linked to filled level 1 indexes 1330 and level 2 indexes 1340.

Figure 14:
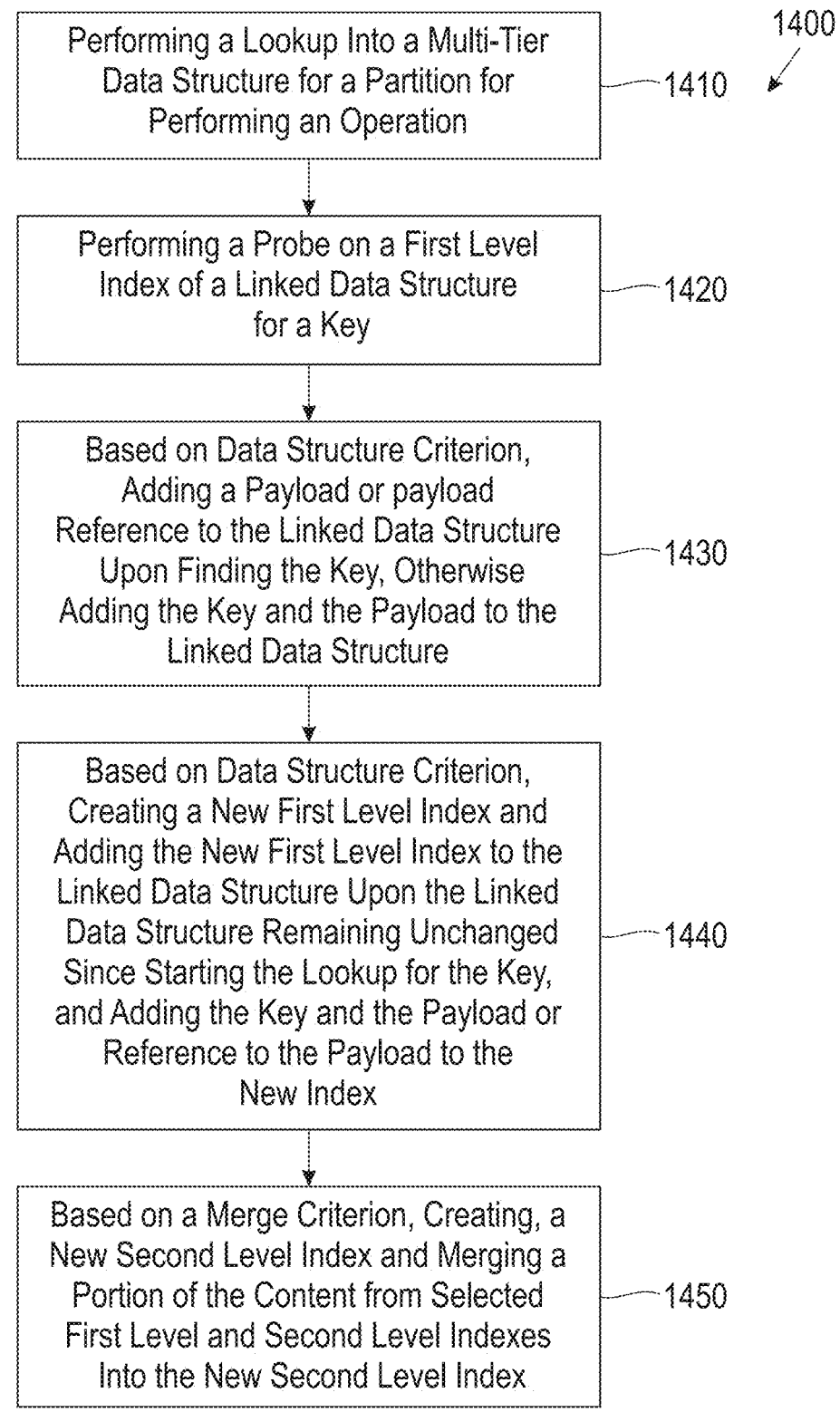
FIG. 14 is a block diagram of a process for multi-tier indexing processing of data structures supporting dynamic update operations, according to an embodiment.

FIG. 14 is a block diagram of a process 1400 for multi-tier indexing processing of data structures supporting dynamic update operations, according to an embodiment. In one embodiment, in block 1410 the process 1400 performs a lookup, by a hashing processor (e.g., FIG. 4, hashing processor 420), into a root (e.g., FIG. 13, root 1310) of a multi-tier data structure (e.g., index 1300, FIG. 13) to find a partition for performing an insert/search operation. In block 1420, process 1400 performs a probe, by the hashing processor, on a first level (level 1) index of a linked data structure (e.g., this first level index could be a chaining hash table) of the multi-tier data structure for a key. In block 1430 the hashing processor, based on data structure criterion, adds a payload to the linked data structure upon finding the key, otherwise if the key is not found, the hashing processor adds the key and the payload to the linked data structure. In block 1440, based on data structure criterion, creates, by a data structure processor (e.g., FIG. 4, data structure processor 410) a new first level index and adds the new first level index to the linked data structure upon the linked data structure remaining unchanged since starting the probe in block 1420, and adds the key and the payload or reference to the payload to the new index. In block 1450 the data structure processor, based on a merge criterion, creates a new second level index and merges a portion of content from selected first level and second level indexes into the new second level index.

In one embodiment, process 1400 may further include updating, by an update processor (e.g., FIG. 4, update processor 415), the linked data structure by replacing indexes whose content has been fully merged with the one or more new second level indexes. The selection of first level and second level indexes for merging into a new second level index also marks the selected first level and second level indexes as not accepting further inserts. In one embodiment the data structure criterion may include one or more of sufficient space in an index of the linked data structure, the index being able to accept additional inserts, the index having an imbalanced structure, or lookup efficiency. In one embodiment, the merge criterion may include one or more of: no on-going merge operation exists on the partition, determining that a merge operation is warranted due to significant content present in the selected first level and second level indexes, or lookup efficiency (e.g., having a large number of indexes to be probed).

In one embodiment, an upper tier of the multi-tier data structure includes a single node containing a mutable dictionary data structure that maps indicator values derived from keys onto pointers to nodes in a lower tier of the multi-tier data structure, where the mutable dictionary structure is efficient for performing individual insert operations. In one example, each node in the lower tier of the multi-tier data structure has one immutable dictionary structure that is efficient for performing lookup operations and bulk loading. Insert operations into the multi-tier data structure include performing a lookup operation into the mutable dictionary structure to select a lower tier node to insert into. Insert operations into the lower tier nodes are made into a most recently added mutable dictionary structure at that node.

In one embodiment, the mutable dictionary structures are periodically merged into the immutable dictionary structure, producing a new immutable dictionary structure. The immutable dictionary structure includes a concise hash table including a first level of bitmap pages and a second level of leaf pages. In one embodiment, the lookup uses a hash value, a result buffer and maximum size as input parameters, and returns as value a number of record identifiers (e.g., TSNs, etc.) found for a desired hash key, and places as many result payloads that fit within the maximum size into the result buffer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for inserting an entry into a multi-tier data structure comprising:
   creating, by a data structure processor, a multi-tier data structure that includes an upper tier comprising a first level that is an extendible hashing dictionary data structure and a second level that is a fixed-size dictionary data structure, and a lower tier comprising an immutable dictionary structure including a concise hash table (CHT) that includes a first level comprising a bitmap array with bitmap pages and a second level comprising leaf pages, wherein leaf page pointers are interleaved within the bitmap array;

performing, by a hashing processor, a first lookup process using a key of the entry into a root node of the multi-tier data structure that determines a partition for performing an insert operation, wherein the extendible hashing dictionary data structure provides lookups using a number of hash bits used as an index into the fixed-size dictionary data structure;

performing a second lookup process for the key, by the hashing processor, on a first level index that is part of a linked data structure holding entries for the found partition;

based on data structure criterion, adding, by the hashing processor, a payload or reference to the payload to the linked data structure upon finding the key, otherwise if the key is not found, adding the key and the payload to the linked data structure;

based on data structure criterion, creating, by the data structure processor, a new first level index and adding the new first level index to the linked data structure upon the linked data structure remaining unchanged since starting the second lookup process for the key, and adding the key and the payload or the reference to payload to the new first level index;

based on a merge criterion, creating, by the data structure processor, a new second level index and merging a portion of content from selected first level and second level indexes into the new second level index, and using the lower tier of the multi-tier data structure instead of the upper tier upon the first level index exceeding a size for the upper tier.

2. The method of claim 1, further comprising:

updating, by an update processor, the linked data structure by replacing indexes with content that has been fully merged with the one or more new second level indexes, wherein the selection of first level and second level indexes for merging into a new second level index also marks the selected first level and second level indexes as not accepting further inserts.

3. The method of claim 1, wherein the data structure criterion comprises one or more of sufficient space in an index of the linked data structure, the index being able to accept additional inserts, the index having an imbalanced structure, or lookup efficiency.

4. The method of claim 1, wherein the merge criterion comprises one or more of:

no on-going merge operation exists on the partition, determining that a merge operation is warranted due to significant content present in the selected first level and second level indexes, or lookup efficiency.

5. The method of claim 2, wherein:

the upper tier of the multi-tier data structure comprises a single node containing a mutable dictionary data structure that maps indicator values derived from keys onto pointers to nodes in the lower tier of the multi-tier data structure;

the mutable dictionary structure is efficient for performing individual insert operations; and the mutable dictionary data structure comprises a data structure without storing keys or attributes, and the mutable dictionary data structure stores hash values of keys and maps hash values to a set of tuple sequence numbers.

6. The method of claim 5, wherein:

each node in the lower tier of the multi-tier data structure has one immutable index data structure that is efficient for performing lookup operations and bulk loading;

inserts into the multi-tier data structure comprise performing a lookup operation into the mutable index data structure to select a lower tier node to insert into;

inserts into the lower tier nodes are made into a most recently added mutable dictionary data structure at that node;

the mutable dictionary data structures are periodically merged into the immutable index data structure, producing a new immutable index data structure; and the immutable dictionary structure does not support insert operations or delete operations.

7. The method of claim 1, wherein the first lookup process uses a hash value, a result buffer and maximum size as input parameters, and returns as value a number of record identifiers found for a desired hash key, and places as many result payloads that fit within the maximum size into the result buffer.

8. A computer program product for inserting an entry into a multi-tier data structure, the computer program product comprising a non-transitory computer readable storage medium having program code embodied therewith, the program code executable by a processor to:

create, by a data structure processor, the multi-tier data structure that includes an upper tier comprising a first level that is an extendible hashing dictionary data structure and a second level that is a fixed-size dictionary data structure, and a lower tier comprising an immutable dictionary structure including a concise hash table (CHT) that includes a first level comprising a bitmap array with bitmap pages and a second level comprising leaf pages, wherein leaf page pointers are interleaved within the bitmap array;

perform, by the processor, a first lookup process using a key of the entry into a root node of the multi-tier data structure that determines partition for performing an insert operation, wherein the extendible hashing dictionary data structure provides lookups using a number of hash bits used as an index into the fixed-size dictionary data structure;

perform a second lookup process, by the processor, for the key on a first level index that is part of a linked data structure holding entries for the found partition;

based on data structure criterion, add, by the processor, a payload or reference to the payload to the linked data structure upon finding the key, otherwise upon the key not being found, adding the key and the payload to the linked data structure;

based on data structure criterion, create, by the data structure processor, a new first level index and adding the new first level index to the linked data structure upon the linked data structure remaining unchanged since starting the second lookup process for the key, and adding the key and the payload or the reference to the payload to the new first level index;

based on a merge criterion, create, by the data structure processor, a new second level index and merging a portion of content from selected first level and second level indexes into the new second level index, and using the lower tier of the multi-tier data structure instead of the upper tier upon the first level index exceeding a size for the upper tier.

9. The computer program product of claim 8, further comprising program code executable by the processor to:
update, by an update processor, the linked data structure by replacing indexes with content that has been fully merged with the one or more new second level indexes, wherein the selection of first level and second level indexes for merging into a new second level index also marks the selected first level and second level indexes as not accepting further inserts.

10. The computer program product of claim 9, wherein the data structure criterion comprises one or more of sufficient space in an index of the linked data structure, the index being able to accept additional inserts, the index having an imbalanced structure, or lookup efficiency.

11. The computer program product of claim 10, wherein the merge criterion comprises one or more of:
no on-going merge operation exists on the partition,
determining that a merge operation is warranted due to significant content
present in the selected first level and second level indexes, or lookup efficiency.

12. The computer program product of claim 8, wherein:
the upper tier of the multi-tier data structure comprises a single node containing a mutable dictionary data structure that maps indicator values derived from keys onto pointers to nodes in the lower tier of the multi-tier data structure;
the mutable dictionary data structure is efficient for performing individual insert operations; and
the mutable dictionary data structure comprises a data structure without storing keys or attributes, and the mutable dictionary data structure stores hash values of keys and maps hash values to a set of tuple sequence numbers.

13. The computer program product of claim 9, wherein:
each node in the lower tier of the multi-tier data structure has one immutable index data structure that is efficient for performing lookup operations and bulk loading;
inserts into the multi-tier data structure comprise performing a lookup operation into the mutable dictionary data structure to select a lower tier node to insert into;
inserts into the lower tier nodes are made into a most recently added mutable dictionary data structure at that node;
the mutable dictionary data structures are periodically merged into the immutable index data structure, producing a new immutable index data structure; and
the immutable dictionary structure does not support insert operations or delete operations.

14. The computer program product of claim 8, wherein the first lookup process uses a hash value, a result buffer and maximum size as input parameters, and returns as value a number of record identifiers found for a desired hash key, and places as many result payloads that fit within the maximum size into the result buffer.

* * * * *